United States Patent

Bedingfield, Sr. et al.

[11] Patent Number: 5,850,606
[45] Date of Patent: Dec. 15, 1998

[54] METHOD AND SYSTEM FOR TRANSFERRING A CELLULAR TELEPHONE CALL BETWEEN INTELLIGENT CELL SITES

[75] Inventors: James Carlton Bedingfield, Sr., Lilburn, Ga.; David A. Gallagher, Fuquay-Varina, N.C.

[73] Assignee: BellSouth Corporation, Atlanta, Ga.

[21] Appl. No.: 649,436

[22] Filed: May 17, 1996

[51] Int. Cl.$^6$ .................................................. H04Q 7/22
[52] U.S. Cl. ........................... 455/439; 455/416; 455/445
[58] Field of Search .................................. 455/436, 439, 455/442, 461, 416, 432, 438, 445; 379/114, 202, 207

[56] References Cited

U.S. PATENT DOCUMENTS

| | | | |
|---|---|---|---|
| 4,829,554 | 5/1989 | Barnes et al. ............................. | 455/439 |
| 5,557,664 | 9/1996 | Burns et al. ............................. | 379/114 |
| 5,646,978 | 7/1997 | Klem et al. ............................. | 455/436 |
| 5,657,375 | 8/1997 | Connolly et al. ....................... | 455/436 |

*Primary Examiner*—Edward F. Urban
*Attorney, Agent, or Firm*—Jones & Askew, LLP

[57] ABSTRACT

A method and system for performing a handoff of a cellular telephone call from a calling station to a mobile cellular telephone between an old intelligent cell site and a new intelligent cell site. The handoff is accomplished by using a conference bridge in a switch to connect a call segment to the new intelligent cell site to the call segments from the calling station to the old intelligent cell site. When a talk path to the new intelligent cell site is established, the talk path to the old intelligent cell site is terminated. The handoff is therefore accomplished by utilizing a conference bridge in the switch rather than putting an existing call on hold while a connection to a new intelligent cell site is established. Using a conference bridge to accomplish a handoff results in minimal interruption in the talk path of the call such that the handoff is imperceptible to the user.

3 Claims, 7 Drawing Sheets

METHOD AND SYSTEM FOR TRANSFERRING A CELLULAR TELEPHONE CALL BETWEEN INTELLIGENT CELL SITES

TECHNICAL FIELD

The present invention relates generally to a cellular telecommunications network, and more specifically, relates to a method and system for transferring a mobile cellular telephone call between cell sites.

BACKGROUND OF THE INVENTION

In recent years, the use of wireless communication devices has greatly increased. Specifically, the use of mobile cellular telephones has become commonplace such that many users, or subscribers, to cellular services use cellular telephones with regularity. One particular advantage of mobile cellular telephones is that when installed in an automobile or otherwise away from the home or office, cellular telephones provide users with the freedom of travel without losing the ability to be constantly linked to a communications network.

The coverage area of a cellular telecommunications network including mobile cellular telephones is divided into smaller coverage areas called "cells" using low power transmitters and coverage-restricted receivers. As is well known in the art, the limited coverage area enables the radio channels used in one cell to be reused in another cell. In a typical cellular telecommunications network, as a mobile cellular telephone within one cell moves across the boundary of the cell into an adjacent cell, control circuitry associated with the cell detects that the signal strength of the telephone in the adjacent cell is stronger and communications with the mobile cellular telephone are "handed off" to the adjacent cell.

A cellular telecommunications network typically utilizes a pair of radio frequencies for each radio channel in each cell. Each cell typically includes at least one paging channel (also referred to as a control channel or signaling channel) and several voice channels. The paging channel receives requests for service from cellular telephones, pages the appropriate cellular telephones, and instructs the cellular telephones to tune to a predetermined voice channel to establish voice communications. The paging channel is responsible for receiving and transmitting data to control the actions of the mobile cellular telephones within the coverage area of the cellular telecommunications network.

In a typical cellular telecommunications network, a mobile cellular telephone communicates with other telephones and compatible electronic equipment through one or more mobile telephone switching offices (MTSOs) and a plurality of cell sites. The MTSO establishes voice communications between a mobile cellular telephone within the coverage area of the cellular telecommunications network and compatible equipment, whether within the cellular telecommunications network or connected to the wireline telephone network. As is familiar to those skilled in the art, the MTSO controls the mobile cellular telephone as it passes through various cell sites under the control of the MTSO. Each cell site contains a transmitter and a receiver for communicating voice and data signals directly to and from the MTSO and the cellular telephone while the mobile cellular telephone is within the transmission range of the cell site.

A block diagram of a typical cellular telecommunications network is shown in FIG. 1. The network is generally shown at 10. The illustrated cellular telephone network 10 includes a MTSO 11 that makes voice connections between a mobile cellular telephone 20 in the network and an originating device 16, typically a telephone, connected to a public switched telephone network (PSTN) 12.

The MTSO 11 is connected via wired land lines to the public switched telephone network 12. The MTSO 11 includes equipment for controlling the processing of cellular calls made to and from the various mobile cellular telephones operating within the coverage area of the MTSO 11.

In a typical cellular telecommunications network, a mobile cellular telephone communicates with other telephones and compatible electronic equipment through one or more MTSOs and a plurality of cell sites, shown in FIG. 1 as reference numerals 14a–14n. As is familiar to those skilled in the art, the MTSO controls the mobile cellular telephone as it passes through various cell sites under the control of the MTSO. Each cell site contains a transmitter and a receiver for communicating voice and data signals directly to and from the MTSO and the mobile unit 20 while the mobile cellular telephone is within the cell site's transmission range. The connection between each cell site and the MTSO may be hard-wired, but is more typically a wireless connection.

The MTSO controls a number of cell sites and therefore has a geographic range for tracking and monitoring cellular telephones. As long as the mobile cellular telephone 20 remains within range of the MTSO 11, the MTSO handles all calls to the cellular telephone. When the mobile cellular telephone is located outside the range of the MTSO 11, another MTSO (not shown), having control over another number of cell sites, controls communications with the mobile cellular telephone.

An alternative cellular telecommunications network is shown in FIG. 2. This alternative cellular telecommunications network, generally shown at 30, utilizes switching equipment available as part of a wireline telephone network. The switching equipment of the wireline telephone network is shown generally at 32. The switching equipment includes an end office (EO) 34, which is a switching system within a local access and transport area (LATA), also called an "exchange", where local loops to customer stations are terminated for purposes of interconnection with each other and with trunks. A calling station 33 is connected to the EO 34. A tandem 36 is connected to the EO 34. Switch 1 and switch 2, identified by reference numerals 38a and 38b, respectively, are connected to the tandem 36 and perform switching functions to route and connect calls to and from telephones or other compatible equipment. For the purposes of this discussion, FIG. 2 shows only two switches. However, it should be understood that many more switches may be connected to tandem 36. Switches such as those described herein may be manufactured by vendors such as Northern Telecom and AT&T. Each switch is also connected to a signal transfer point (STP) 41. The STP 41 is connected between switches to support signaling system 7 (SS7) messages between switches.

In the alternative cellular telecommunications network of FIG. 2, a number of "intelligent cell sites" are connected to the switches of the existing wireline network. Each intelligent cell site (ICS) is similar to the cell sites described with reference to FIG. 1 in that each intelligent cell site transmits and receives signals to and from mobile cellular telephones within the range of the intelligent cell site. Additionally, each intelligent cell site is coupled to a computer with telephony capability that includes programming for controlling, in part, communication with the switch and a mobile cellular telephone.

In FIG. 2, intelligent cell site 1 (ICS1) and intelligent cell site 2 (ICS2), identified by reference numerals 40a and 40b, respectively, are connected to switch 1. Other intelligent cell sites may be connected to switch 1 and to other switches. FIG. 2, for example, shows ICSn, identified by reference numeral 40n, connected to switch 2. Each intelligent cell site is connected to a switch via a hard-wired connection. The hard-wired connection consists of an Integrated Services Digital Network (ISDN) line, shown as reference numerals 39a–n in FIG. 2. The switches 38a and 38b are also connected to each other via multiple SS7 trunks 42. A central site controller (CSC) 45 is operatively connected to each intelligent cell site for controlling communications between the various intelligent cell sites.

As is well known in the art, there are two types of ISDN lines. A primary rate ISDN line, typically used for a PBX, includes 23 B-channels and one D-channel. A basic rate interface (BRI) ISDN line includes two B-channels and one D-channel. A B-channel is a voice channel for providing voice communications. Each B-channel of an ISDN line is typically used for a single two-way communication. An ISDN line also includes a D-channel, which provides out-of-band signaling capabilities. The D-channel can be used to establish, modify, and disconnect calls under the control of a user or automated equipment. Signals provided on the D-channel are imperceptible or transparent to a user utilizing B-channel voice communications.

It should be appreciated that the alternative cellular telecommunications network described in FIG. 2 provides cellular communications without the use of MTSOs. As shown in FIG. 2, cellular telephone communications can be implemented using existing switches that are part of existing wireline telephone networks. The implementation may include software modifications to existing wireline telephone network switches. One aspect of cellular communications not encountered in wireline networks is the need to handoff calls between cell sites when a mobile cellular telephone moves out of range of one cell site and into the range of another cell site. Such a handoff should be accomplished such that it is virtually undetectable to the user of the cellular telephone, i.e., there should be a minimum interruption in the talk path.

In association with the network shown in FIG. 2, a current scheme for handing off a call is to simply put an existing active call at one cell site on hold while a connection with another cell site is established. For example, with reference to FIG. 2, assume a call is established between the calling station 33 and the mobile cellular telephone 50 via switch 1 and ICS1. If the mobile cellular telephone 50 is then moved out of range of ICS1 and into range of ICS2, a handoff of the call must occur. The current scheme places the existing active call through ICS1 on hold and establishes a connection between switch 1 and ICS2. Once the connection with ICS2 is established, the held call is transferred, and the handoff is completed by dropping the originally held call on ICS1. The calling station 33 is then connected to the mobile cellular telephone via ICS2. However, placing the existing call on hold while a second connection with ICS2 is established necessarily causes a period of silence to be detected by the user. This period of silence is at least 0.75 seconds or longer, which is an undesirable interruption of the talk path of the call. For a call that is handed off between intelligent cell sites that are connected to different switches, such as between ICS1 and ICSn in FIG. 2, the period of silence may be even longer.

One proposed scheme for handling handoffs of cellular calls between intelligent cell sites (also called radio ports) is the Automatic Link Transfer (ALT), developed by Bell Communications Research (BELLCORE). The scheme is described in GR-2801-CORE, Issue 1, Revision 1, Jul. 1, 1995, entitled "SWITCHING AND SIGNALING GENERIC REQUIREMENTS TO SUPPORT 1.8 GHz PERSONAL COMMUNICATIONS SERVICES (PCS) PROVIDERS", which is hereby incorporated by reference. The implementation of ALT requires an extensive development effort to modify existing switches and is presently undergoing industry review and comment.

The current design of ALT is based on the assumption that the wireline telephone network is compatible with the mobile cellular telephones used in connection therewith. ALT performs intra-switch handoffs, i.e., handoffs between intelligent cell sites that are connected to the same switch, such as ICS1 and ICS2 in FIG. 2. However, because the current design of ALT supports and manages call waiting, three-way calling, and call forwarding features, ALT does not support inter-switch handoffs, i.e., a handoff between intelligent cell sites that are connected to different switches, such as ICS1 and ICSn in FIG. 2. Therefore, the current design of ALT supports a handoff between ICS1 and ICS2, but does not support a handoff between ICS1 and ICSn.

Inter-switch handoffs present a particular problem. As frequently occurs in a cellular telecommunications network, a mobile cellular telephone is moved between intelligent cell sites that are connected to different switches, as shown in FIG. 3. Such movement of the mobile cellular telephone 50 is shown at 60. If the mobile cellular telephone 50 is moved multiple times across the boundary of ICS1, 40a, and ICSn, 40n, multiple handoffs must occur. Each time a handoff occurs, communications must be established on a trunk 42 connecting the switches 38a and 38b that are connected to the respective intelligent cell sites 40a and 40n. For each handoff, a communication ties up a trunk 42 between switch 1 and switch 2. Thus, for each movement of the mobile cellular telephone 50 across the boundary of intelligent cell sites 40a and 40n (there are six such exemplary movements shown in FIG. 3), a signal is transmitted on a trunk 42 between the switches. Such multiple uses of ISDN lines between switches, called "shoelacing", is extremely inefficient and creates complicated processing requirements to allow the switches to handle the multiple handoffs.

Therefore, a need exists for a method and system for controlling a call in a cellular telecommunications network without the use of a MTSO. A further need exists for a method and system for handing off a call between intelligent cell sites in a cellular telecommunications network without placing one segment of the call on hold, thereby minimizing the interruption in talk path during the handoff. A still further need exists for a method and system for providing intra-switch handoffs and inter-switch handoffs that eliminate shoelacing. An additional need exists for a method and system for handing off a call in a cellular telecommunications network that can be implemented using only minimal software modifications to existing wireline telephone network switches.

SUMMARY OF THE INVENTION

The present invention performs a handoff of a cellular telephone call from a calling station to a mobile cellular telephone between an old intelligent cell site and a new intelligent cell site. The method of performing a handoff in accordance with the present invention is called a Generic Automatic Link Transfer (GALT).

Generally, a handoff is accomplished in accordance with GALT by using a conference bridge in a switch to connect a call segment to the new intelligent cell site to the call segments from the calling station to the old intelligent cell site. When a talk path to the new intelligent cell site is established, the talk path to the old intelligent cell site is terminated. The handoff is therefore accomplished by utilizing a conference bridge in the switch rather than putting an existing call on hold while a connection to a new intelligent cell site is established. Using a conference bridge to accomplish a handoff results in minimal interruption in the talk path of the call such that the handoff is imperceptible to the user.

In accordance with a first embodiment of the present invention, an ISDN line between a switch and the old intelligent cell site is equipped with a feature activator that implements the handoff of calls between intelligent cell sites. A call is made from a calling station to a mobile cellular telephone that is within the range of the old intelligent cell site.

As a result of the mobile cellular telephone moving out of the range of the old intelligent cell site and into the range of the new intelligent cell site, the new intelligent cell site is made aware that a handoff is required. To accomplish the handoff, the new intelligent cell site initiates a call to the old intelligent cell site via a switch connected to the old intelligent cell site. Within the switch, a conference bridge is reserved. The conference bridge connects a call segment from the calling station to the switch, a call segment from the switch to the old intelligent cell site, and a call segment from the switch to the new intelligent cell site.

Upon connection of the conference bridge, the mobile cellular telephone is notified to switch radio channels to allow communications to be controlled by the new intelligent cell site. The call segment between the switch and the old intelligent cell site is then dropped and the conference bridge is released.

In accordance with a second embodiment of the present invention, the new intelligent cell site initiates a call to the old intelligent cell site that includes an initial address message that includes a generic address parameter (GAP). The switch reserves a conference bridge and connects a call segment from the calling station to the switch, a call segment from the switch to the old intelligent cell site, and a call segment from the switch to the new intelligent cell site. After the connection to the conference bridge is completed, the mobile cellular telephone changes radio channels such that communication with the mobile cellular telephone is transferred from the old intelligent cell site to the new intelligent cell site. The conference bridge is released, thus terminating the call segment from the switch to the old intelligent cell site.

In accordance with a third embodiment of the present invention, a call is established between a calling station and a mobile cellular telephone within the range of the old intelligent cell site. The switch assigns a "GALT Virtual Directory Number" (GVDN) to the call. As a result of the mobile cellular telephone moving out of the range of the old intelligent cell site and into the range of the new intelligent cell site, the new intelligent cell site initiates a call to the switch. The called number is the GVDN. Because the GVDN is not the number of an actual ISDN line, calling the GVDN does not tie up an ISDN line nor does it generate a call appearance on the ISDN line.

When the switch receives the call to the GVDN, the switch recognizes the called number as a request for GALT. The switch identifies all call segments and connects all call segments to a conference bridge.

Upon connection of the conference bridge, the mobile cellular telephone is notified to switch radio channels to allow communications to be controlled by the new intelligent cell site. After the mobile cellular telephone has switched channels, the conference bridge is then released, thus terminating the talk path which is no longer in use from the switch to the old intelligent cell site.

DETAILED DESCRIPTION

Figure 1:
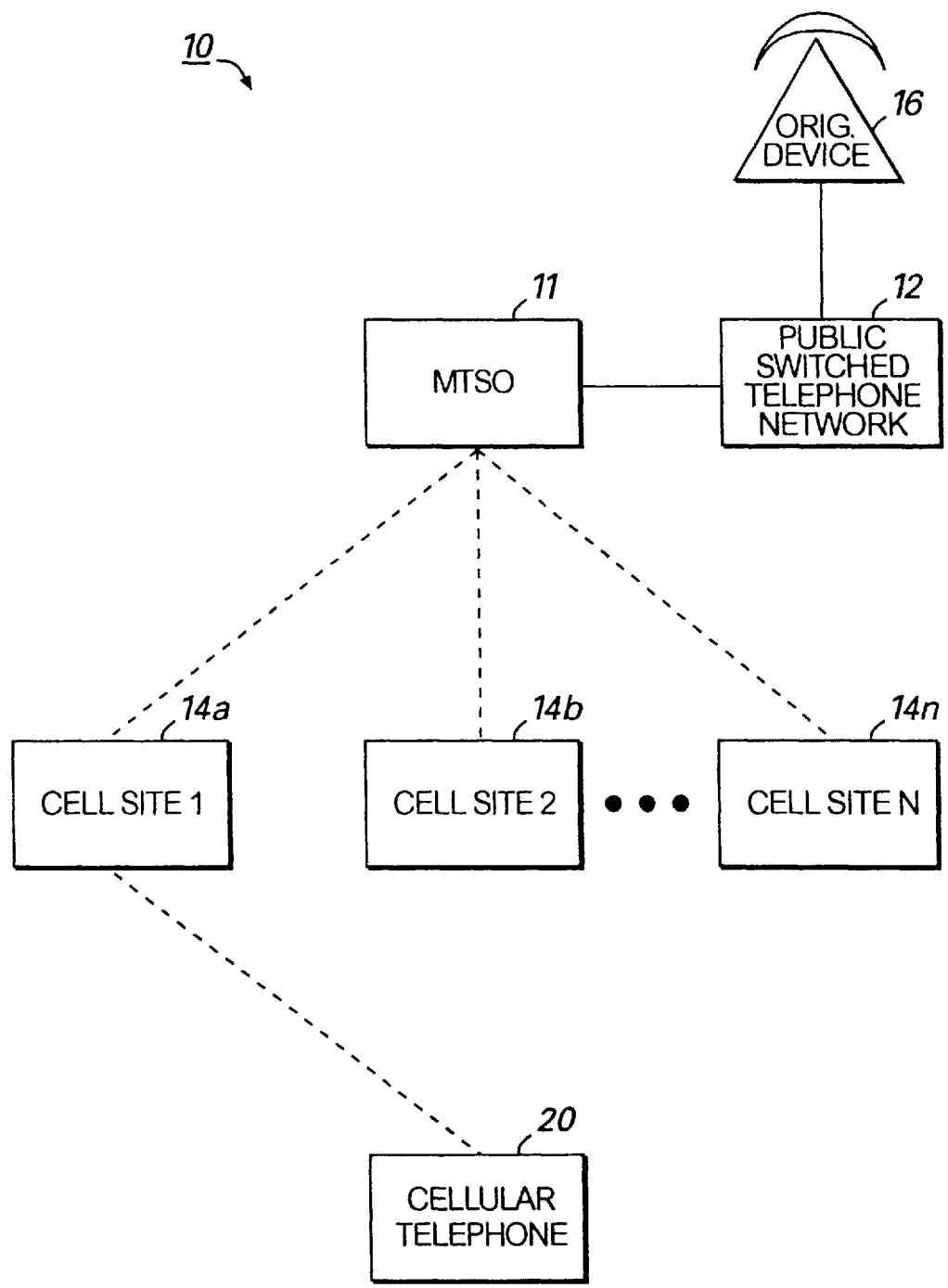
FIG. 1 is a block diagram of a typical cellular telecommunications network.

Turning next to the drawing figures in which like numerals represent like parts, the preferred embodiment will now be described in detail.

Figure 2:
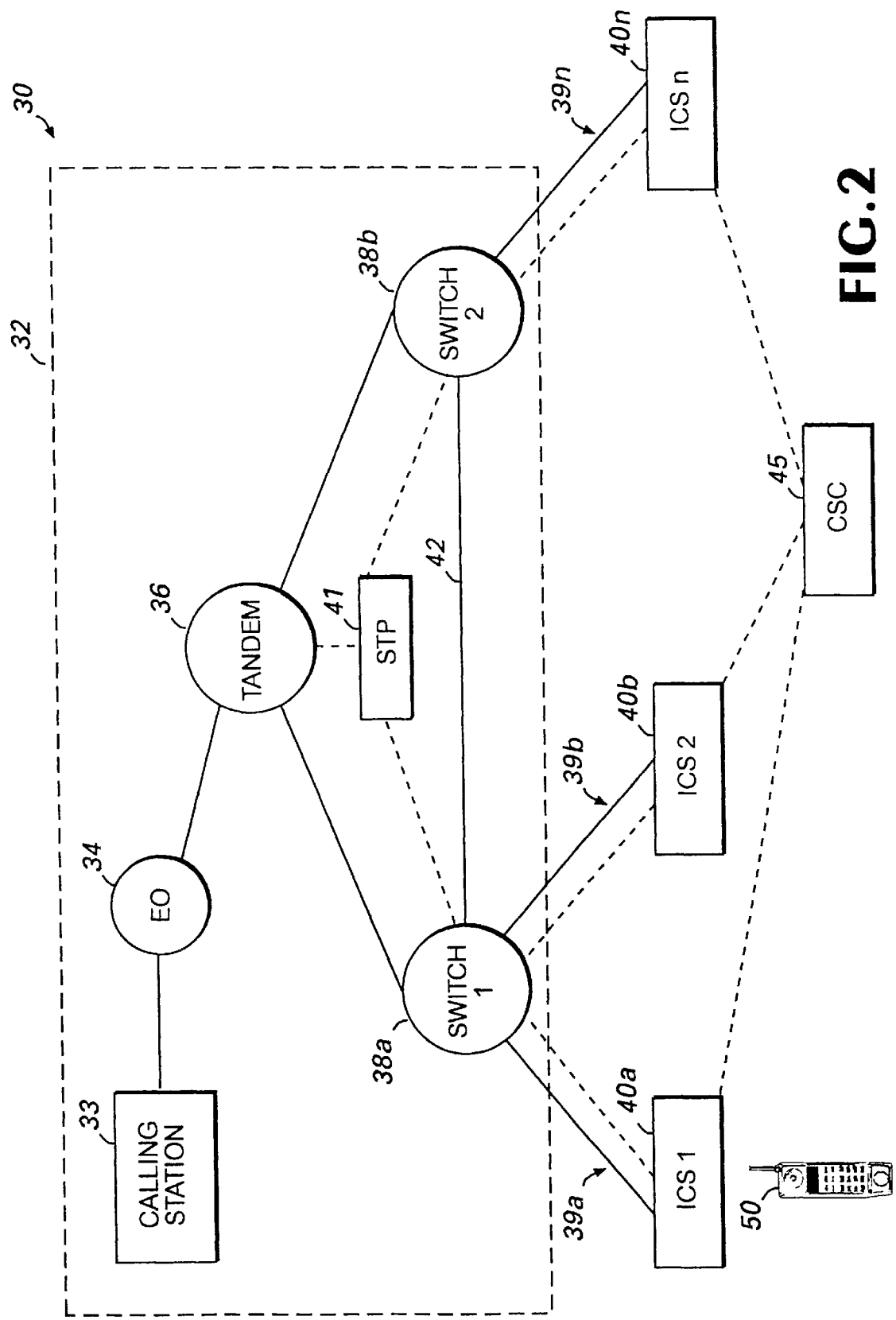
FIG. 2 is a block diagram of an alternative cellular telecommunications network in which the present invention is preferably implemented.
Figure 3:
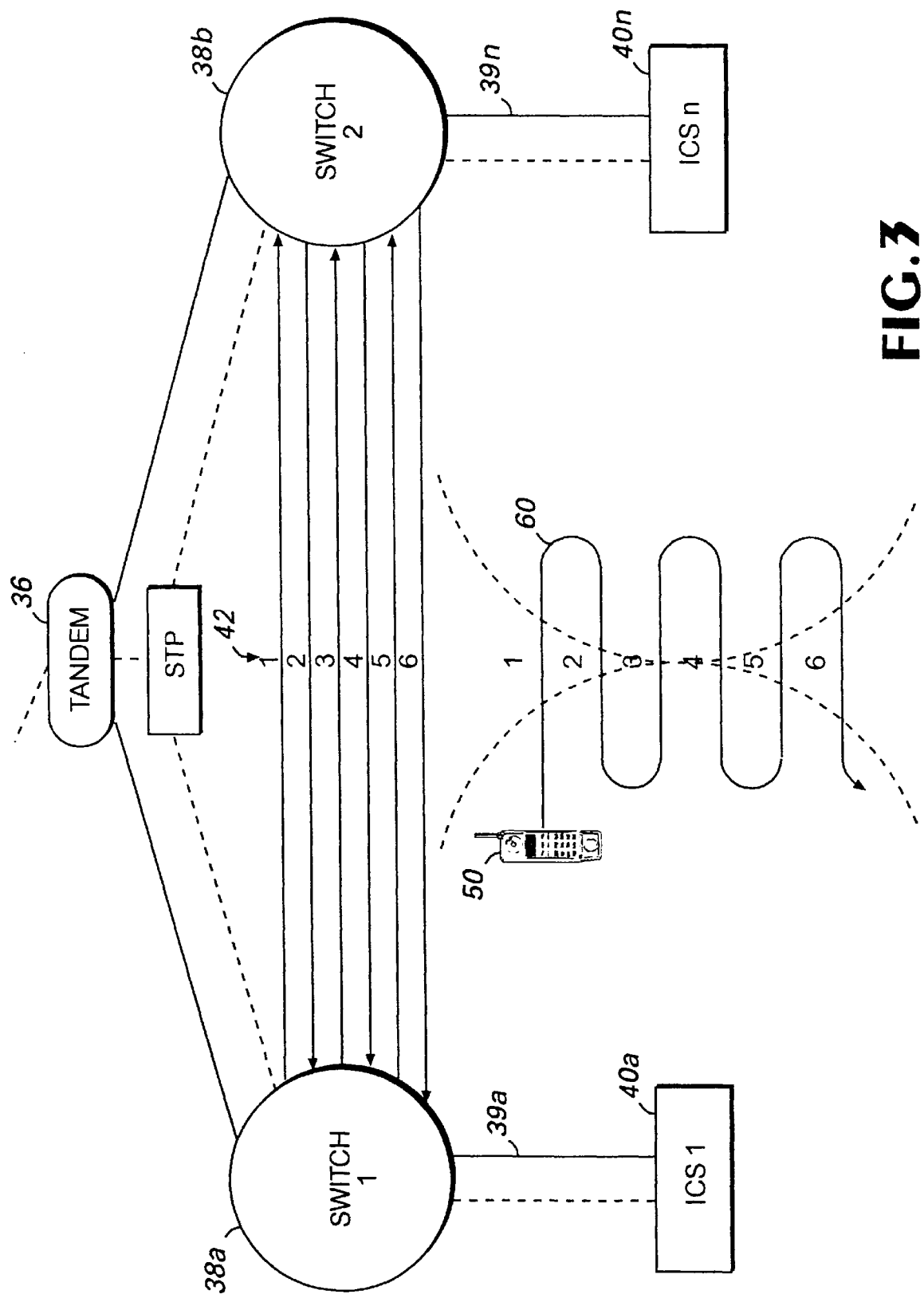
FIG. 3 is a block diagram showing the shoelacing problem caused by multiple handoffs from movements of a mobile cellular telephone across the boundary of adjacent intelligent cell sites.

The present invention performs a handoff of a cellular telephone call from a calling station to a mobile cellular telephone between intelligent cell sites. The method of performing a handoff in accordance with the present invention is called a Generic Automatic Link Transfer (GALT). A GALT may be performed for any type of cellular radio equipment in a cellular telecommunications network and is not limited to a specific type of operating environment or a particular type of equipment. For example, GALT may be implemented not only on a cellular telecommunications network such as that described in FIG. 2, but may also be implemented on other types of networks, such as a personal communication services (PCS) network. Similar to the cellular telecommunications network of FIG. 2, PCS establishes and supports communications between a plurality of cells. PCS utilizes radio communications in the 1800–2200 megahertz (MHz) spectrum. GALT is preferably implemented by software modification of existing wireline telephone network switches and is invoked and maintained by existing telephone network systems. Such implementation of GALT, as described in this disclosure, can be accomplished by those having ordinary skill in the art.

GALT is invoked when a call from a calling station to a mobile cellular telephone in the cellular telecommunication network is handed off between intelligent cell sites. Generally, a handoff is accomplished in accordance with GALT by using a conference bridge in the switch to connect a call segment to the new intelligent cell site to the call segments from the calling station, through the switch, to the old intelligent cell site. When a talk path to the new intelligent cell site is established, the talk path to the old intelligent cell site is terminated. The handoff is therefore accomplished by utilizing a conference bridge in the switch rather than putting an existing call on hold while a connection to a new intelligent cell site is established. Using a conference bridge to accomplish a handoff results in minimal interruption in the talk path of the call such that the handoff is imperceptible to the user.

For the purposes of this discussion, the intelligent cell site from which the call is being handed off is called the "old" intelligent cell site (ICSold) and the intelligent cell site to which the call is being handed off is called the "new" intelligent cell site (ICSnew). The identity of the new intelligent cell site is determined in a manner well known to those skilled in the art. It is well known that an old intelligent cell site may constantly monitor the strength of signals received from mobile cellular telephones within its range, such that when a signal from a mobile cellular telephone becomes too weak, the old intelligent cell site identifies a new intelligent cell site. The mobile cellular telephone is instructed by either the old or new intelligent cell site that the call on the mobile cellular telephone is to be handed off from the old intelligent cell site to the new intelligent cell site.

Alternatively, the mobile cellular telephone may monitor signals received from intelligent cell sites to determine when a handoff from an old intelligent cell site to a new intelligent cell site is required. When the mobile cellular telephone determines that a handoff is required, the mobile cellular telephone informs both the old intelligent cell site and the new intelligent cell site that the handoff is to occur.

It should be understood that the method and system of the present invention, as described herein, are not limited to use in connection with a particular method and system for determining that a handoff is required and for identifying a new intelligent cell site. The present invention may be implemented whenever a handoff is to occur, regardless of the manner in which the determination of a new intelligent cell site is accomplished. In the preferred embodiment of the present invention, after a requirement for a handoff is required and a new intelligent cell site is identified, the new intelligent cell site calls the old intelligent cell site to inform the old intelligent cell site that a handoff should be performed when a mobile cellular telephone that is being used for a call is moved between intelligent cell sites.

Additionally, the present invention is not limited to a call placed to a mobile cellular telephone from a wireline telephone. The present invention may be implemented when a call is made to or from a mobile cellular telephone within the cellular telecommunications network and between mobile cellular telephones through the PSTN. The present invention may also be implemented when a call is made to telephones located in different networks.

As described above with reference to FIG. 2, each intelligent cell site is connected to a switch by ISDN lines. The ISDN lines connecting each intelligent cell site to a switch provide for two types of messages. The first type of messages are "functional signaling" messages which are defined in accordance with TR-TSY-000268, Issue 3, Revision 2, March 1994, entitled, "ISDN ACCESS CALL CONTROL SWITCHING AND SIGNALING REQUIREMENTS". Each function has a unique message, in accordance with the above standard, that is recognized by the switch such that the switch can implement the operations associated with the function. Such functional signaling includes origination, hold, transfer, conference, and drop signals.

The second type of messages for use on ISDN lines are "stimulus signaling" messages. These types of messages use INFO messages, as defined by TR-TSY-000268, and the switch, upon receipt of an INFO, must determine the meaning of the message. The messages are typically a "feature activator" associated with a particular user's telephone. Switches can be easily programmed to receive feature activator messages and perform the operations associated therewith. The present invention is preferably implemented through the use of a feature activator message. GALT may be implemented on switches which support ISDN lines. The present invention also assumes that the cellular radio equipment such as the intelligent cell sites and the mobile cellular telephone handset manage any call waiting, three-way calling, and call forwarding features.

The present invention relates to a method and system for transferring a call between intelligent cell sites. The present invention performs a transfer, or handoff, of a cellular telephone call between intelligent cell sites.

FIRST EMBODIMENT OF THE PRESENT INVENTION

A first embodiment of the method and system of the present invention is described with reference to the block diagram of FIG. 4 and the call flow diagram of FIG. 5.

Figure 4:
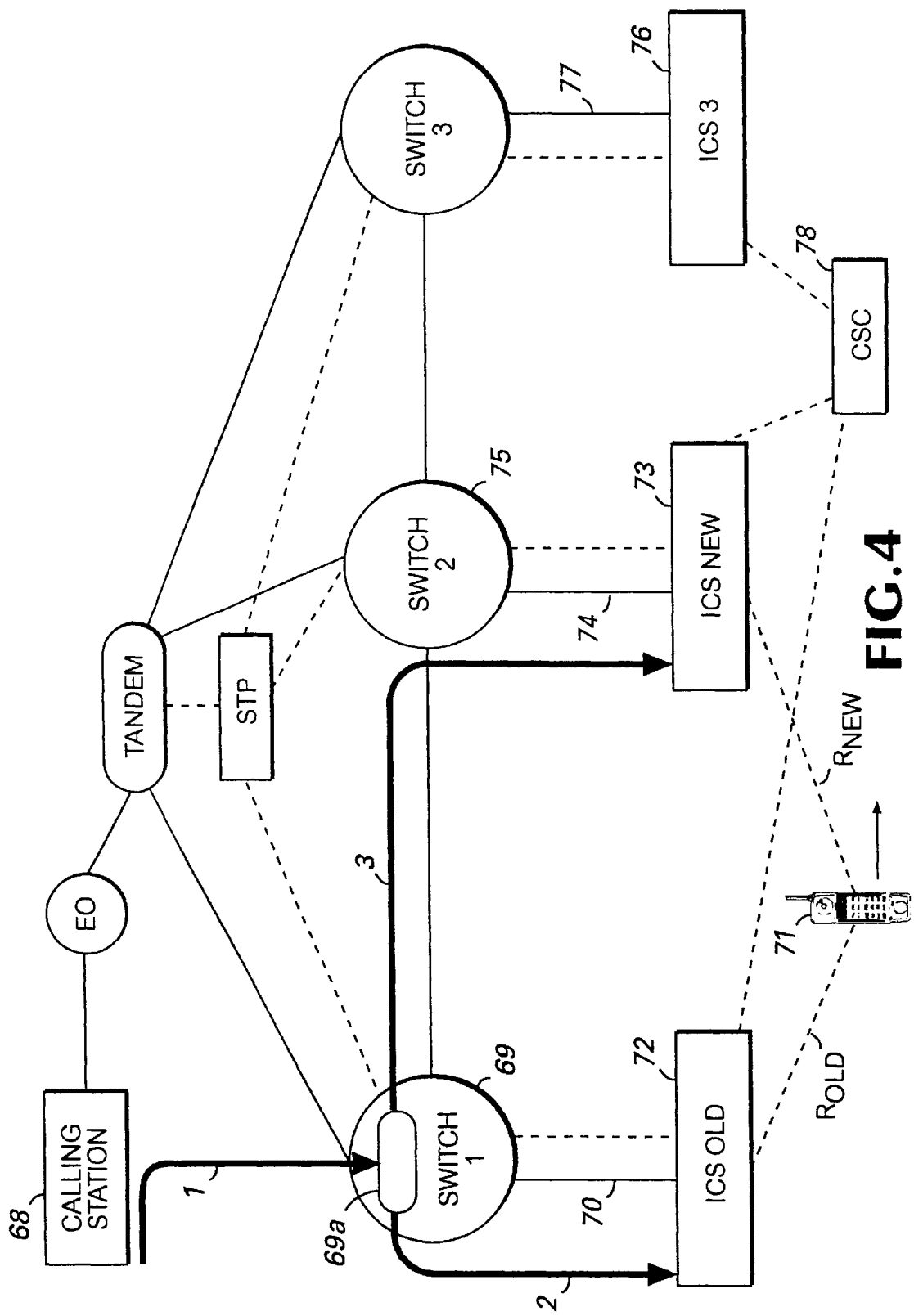
FIG. 4 is a block diagram illustrating a method and system for the handoff of calls between intelligent cell sites.
Figure 5:
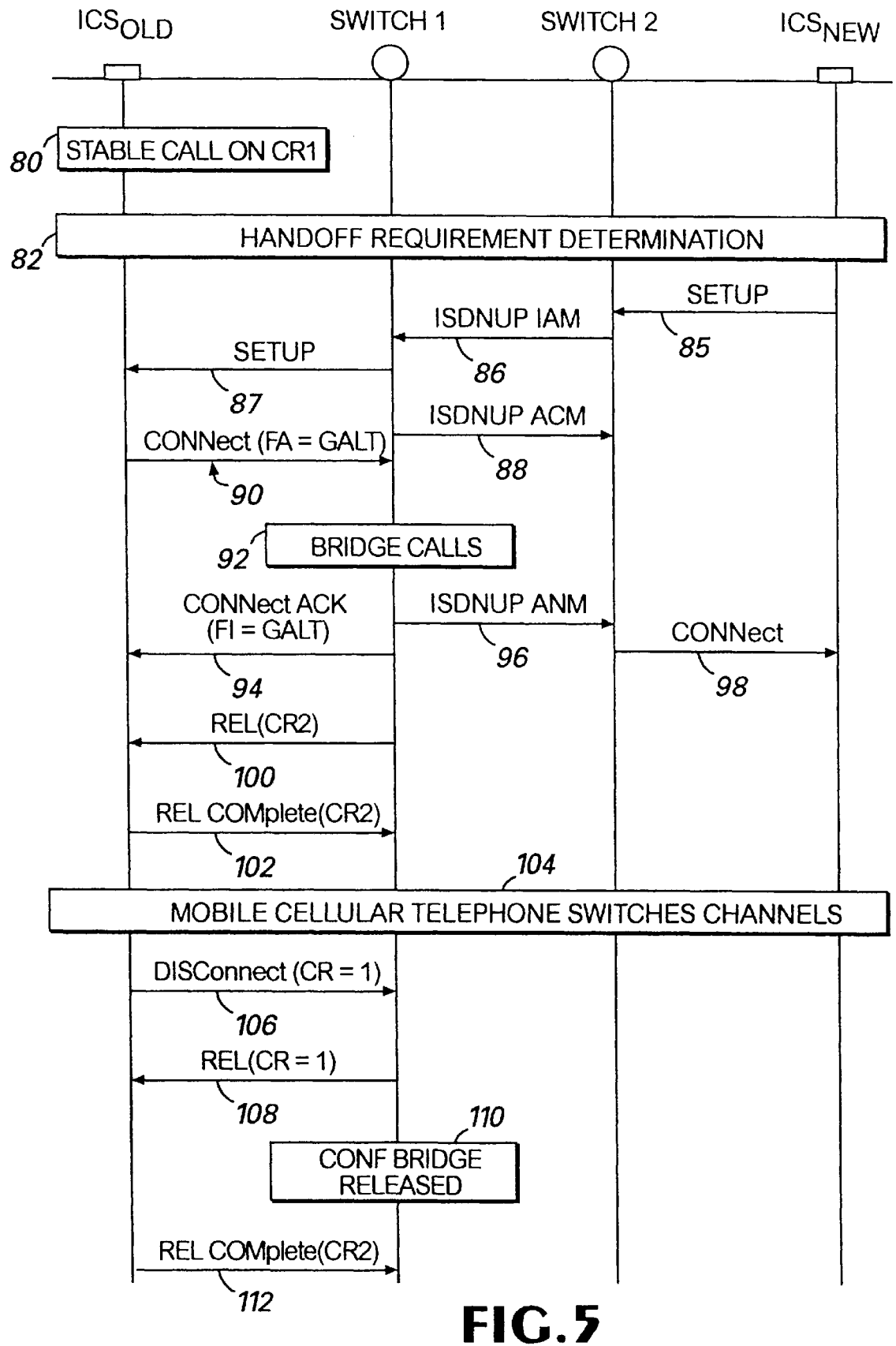
FIG. 5 is a call flow diagram describing a first embodiment of the preferred method and system for transferring a call between intelligent cell sites.

FIG. 4 is a block diagram generally describing the environment is which a handoff between an old intelligent cell site and a new intelligent cell site is implemented, in accordance with the present invention. Old intelligent cell site 72 (ICSold) is connected to switch 1, 69, and a new intelligent cell site 73 (ICSnew) is connected to switch 2, 75. It should be understood that switch 1 and switch 2 should support ISDN user part (ISUP) call setup signaling.

In accordance with the present invention, the ISDN line 70 between switch 1 and ICSold is equipped with a feature activator that implements the handoff of calls between intelligent cell sites. In the example described herein with reference to FIG. 4, the number associated with the ISDN line 70 is 303-1122. A call is made from a calling station 68 to the number of a mobile cellular telephone 71. In this example, the mobile cellular telephone 71 is within the range of ICSold. The call is routed through switch 1 and then to ICSold on ISDN line 70.

The call is maintained as a first call appearance on ISDN line 70. A call appearance is defined as part of the protocol between a switch and a telephone. A call appearance is generated when a call is made to a particular ISDN number. A single ISDN channel associated with an ISDN line can have multiple call appearances.

As a result of the mobile cellular telephone 71 moving out of the range of ICSold 72 and into the range of ICSnew 73, ICSnew 73 is made aware that a handoff is required. To accomplish the handoff, ICSnew 73 initiates a call to ICSold 72. ICSnew obtains the ISDN number 70 of ICSold either via the mobile cellular telephone handset, from the central site controller, or from ICSold. It should be understood that communications with ICSold can be established, through switch 1, over ISDN line 70 by calling the number associated with ISDN line 70. Within switch 1, a conference bridge 69a is reserved. The conference bridge 69a connects call segment 1 from the calling station 68 to switch 1, call segment 2 from switch 1 to ICSold on ISDN line 70, and call segment 3 from switch 1 through switch 2 to ICSnew on ISDN line 74. It should be understood that a radio transmission segment (Rold) also exists between ICSold and the mobile cellular telephone such that the talk path between the calling station 68 and the mobile cellular telephone 71 is completed.

Upon connection of the conference bridge, a connection is established not only from the calling station 68 to ICSold, but also from the calling station to ICSnew via call segment 1 and call segment 3. Upon connection of the conference bridge, communication with the mobile cellular telephone continues to occur through ICSold. The mobile cellular telephone is notified to switch radio channels to allow communications to be controlled by ICSnew. The mobile cellular telephone then switches channels and communication is established with the mobile cellular telephone and ICSnew via radio transmission segment Rnew. Call segment 2 between switch 1 and ICSold is then dropped and the conference bridge is released.

It should be understood that an advantage of the first embodiment of the present invention described above is that using the D-channel to establish a conference bridge without putting a call segment on hold results in a very short interruption in talk path. Using a conference bridge to connect calls segments without putting a call segment on hold causes an interruption in the talk path on the order of 0.25 seconds or less, which is virtually undetectable to the user. It should also be understood that all messaging as described above is sent on the D-channel of the associated ISDN lines, such that the messages are imperceptible to the user who is using the B-channel of the ISDN line.

The handoff between intelligent cell sites as described in FIG. 4 is also described with reference to the call flow diagram of FIG. 5. A call is established 80 to the cellular mobile telephone via ICSold. When the mobile cellular telephone moves out of the range of ICSold and into the range of ICSnew, it is determined that a handoff must occur from ICSold to ICSnew. As is well known to those skilled in the art, this handoff requirement determination 82 is accomplished by signaling external to that shown in the call flow diagram of FIG. 5. During the handoff requirement determination, ICSnew obtains the number of the ISDN line associated with ICSold.

ICSnew then initiates a call to ICSold. The call from ICSnew to ICSold is shown as reference numerals 85, 86, and 87. ICSnew obtains the ISDN number of ICSold either from the mobile cellular telephone handset or from the central site controller. The call from ICSnew to ICSold is accomplished using standard Signaling System 7 (SS7) protocols. The SS7 message includes the number associated with the ISDN line of ICSnew. The called number is the number associated with the ISDN line connecting ICSold to switch 1. Switch 1, at 87, delivers a SETUP message to ICSold via the D-channel of the ISDN line associated with ICSold, where the SETUP message appears as a second call appearance. Switch 1 also sends an acknowledgment message (ISDN ACM) 88 to switch 2. It should be appreciated that a B-channel of an ISDN line may have multiple call appearances but only one call appearance can be active on the B-channel at any one time.

ICSold responds to the SETUP message with a CONNect message 90 to switch 1, which includes a feature activator message requesting that switch 1 perform a handoff from ICSold to ICSnew. Upon receiving the appropriate feature activator message, switch 1 reserves a conference bridge in switch 1. Switch 1 connects call segment 1 from the calling station to switch 1, call segment 2 from switch 1 to ICSold, and call segment 3 from switch 1 to ICSnew to the conference bridge. This connection to the conference bridge is identified at 92. After the call segments are connected via the conference bridge, switch 1 returns an acknowledgment message (CONNect ACK) 94 to ICSold. Switch 1 also sends an answer message (ISDNUP ANM) 96 to switch 2. Switch 2 then sends a CONNect message 98 to ICSnew informing ICSnew that the connection to the conference bridge has been completed.

After the conference bridge has connected call segment 3 between switch 1 and ICSnew, switch 1 sends a release message (REL) 100 to ICSold to release segment 2 from switch 1 to ICSold. ICSold then sends a release complete message (REL COMplete) 102 to switch 1. The mobile cellular telephone is then notified to switch radio channels at 104 to allow communications with the mobile cellular telephone to be controlled by ICSnew. The mobile cellular telephone then switches channels and communication is established with the mobile cellular telephone and ICSnew via radio transmission segment Rnew.

After the handoff from ICSold to ICSnew, ICSold then sends a disconnect message (DISConnect) 106 to switch 1, which then sends a release message (REL) 108 to ICSold, thus terminating the talk path which is no longer in use from switch 1 to ICSold. The conference bridge is then released 110, making the conference bridge available for future use in association with other calls. ICSold sends a release complete message (REL COMplete) 112 to switch 1.

It should be understood that by using a conference bridge to connect all call segments and then releasing one call segment to effect the handoff, the need to place a call segment on hold to perform a handoff is eliminated. Using a conference bridge to connect calls segments causes an interruption in the talk path of approximately 0.25 seconds, which is virtually undetectable to the user. It should also be understood that all messaging as described above is sent on the D-channel of the associated ISDN lines, such that the messages are imperceptible to the user who is using the B-channel of the ISDN line.

If a subsequent handoff is required, either from ICSnew back to ICSold or from ICSnew to another intelligent cell site, the above described method is performed again. No memory of the called numbers used in any previous handoff is maintained by the switch, so the entire method described above is performed again when a handoff is required. Thus, the above method requires that a mobile cellular telephone that moved frequently out of and back into range of the same intelligent cell site will utilize multiple trunks that connect to other switches that loop back to the same switch.

SECOND EMBODIMENT OF THE PRESENT INVENTION

In the method and system described with reference to FIG. 5, the recognition of the incoming call requesting a handoff is handled by the old intelligent cell site. In accordance with a second embodiment of the present invention, a generic address parameter (GAP), part of the SS7 signaling protocol, allows additional call information to be passed between switches. This prevents the need for additional call appearances on the ISDN line serving the old intelligent cell site during a handoff.

The method and system for performing a handoff using a generic address parameter is described with reference to the call flow diagram of FIG. 6. It should be understood that the call flows described in FIG. 6 occur in the environment as described in the block diagram of FIG. 4.

Figure 6:
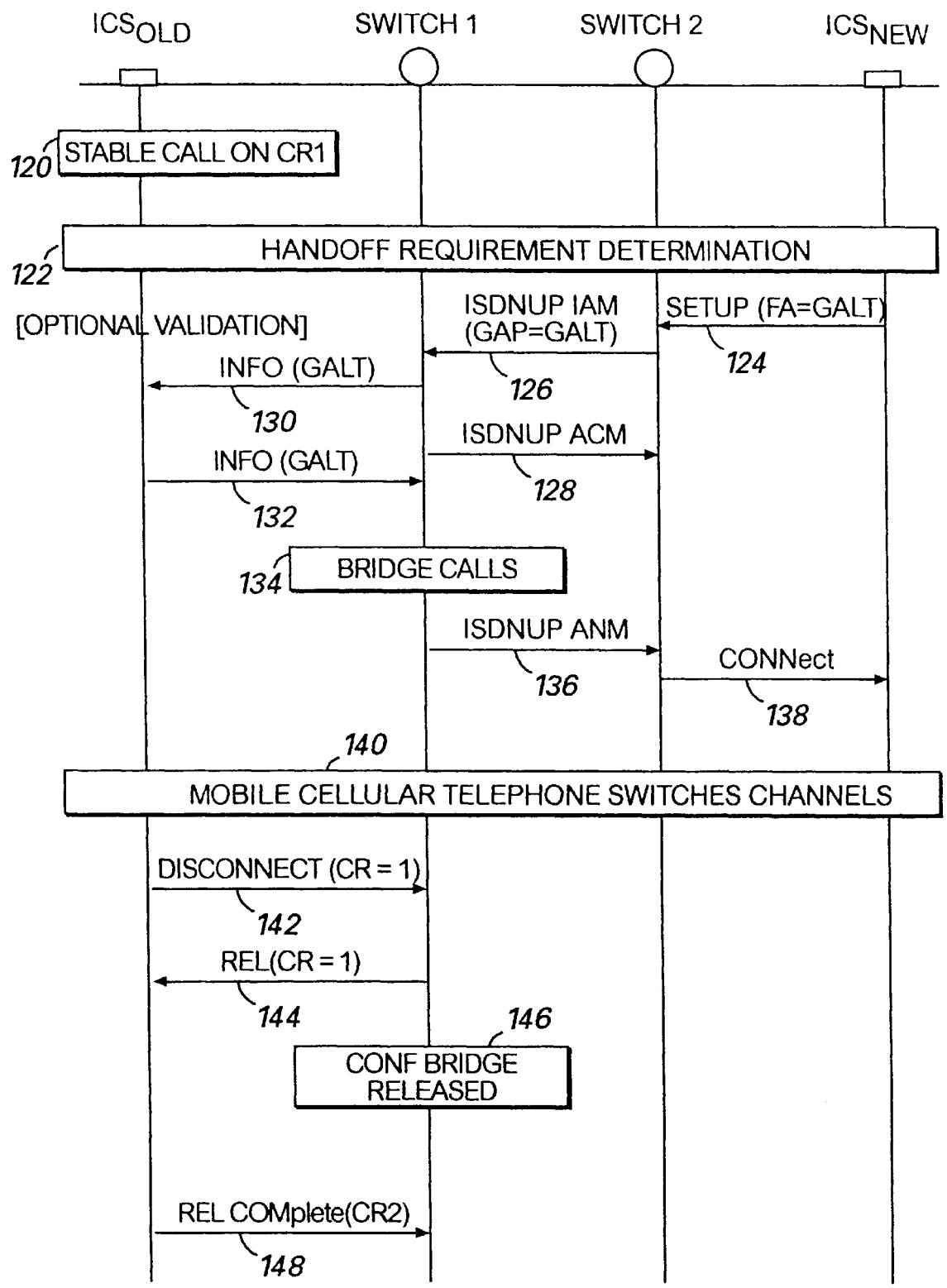
FIG. 6 is a call flow diagram describing a second embodiment of the preferred method and system for transferring a call between intelligent cell sites.

A call is established between the calling station and a mobile cellular telephone within the range of ICSold, as shown at 120 in FIG. 6. As a result of the mobile cellular telephone moving out of the range of ICSold and into the range of ICSnew, ICSnew is notified that a handoff is required at 122, as discussed above with reference to FIG. 5.

ICSnew initiates a call to switch 2 and sends a set up message (SETUP) 124 to switch 2, including a feature activator message associated with the handoff method and system of the present invention. Switch 2 calls switch 1, connected to ICSold, and delivers an initial address message (ISDN IAM) 126. The telephone number at which switch 1 can be called is obtained either from the mobile cellular telephone, from the CSC, or from ICSold. The initial address message 126 is an SS7 message that includes the generic address parameter (GAP). Switch 1 recognizes the GAP as a request to initiate a handoff and sends an acknowledgment message (ISDNUP ACM) 128 to switch 2.

Switch 1 may then send a message (INFO) 130 to ICSold asking whether a handoff may be initiated. ICSold then may respond with a message (INFO) 132 to switch 1 that a handoff may or may not take place. It should be understood that messages 130 and 132 can be used to add security to the cellular communication occurring on the mobile cellular telephone. It should also be understood that messages 130 and 132 are optional and are not required for implementation of the method and system for performing handoffs between intelligent cell sites.

In a manner similar to that described above with reference to FIG. 4, switch 1 reserves a conference bridge in switch 1. Switch 1 connects call segment 1 from the calling station to switch 1, call segment 2 from switch 1 to ICSold, and call segment 3 from switch 1 to ICSnew to the conference bridge. This connection to the conference bridge is identified at 134. After the call segments are connected via the conference bridge, switch 1 sends an answer message (ISDNUP ANM) 136 to switch 2, which sends a CONNect message 138 to ICSnew, informing ICSnew that the connection to the conference bridge has been completed.

After the connection to the conference bridge is completed, the mobile cellular telephone changes radio channels at 140 such that communication with the mobile cellular telephone occurs through ICSnew rather than ICSold. ICSold then sends a disconnect message (DISConnect) 142 to switch 1. Switch 1 then sends a release message (REL) 144 to ICSold, thus terminating call segment 2 which is no longer in use from switch 1 to ICSold. The conference bridge is released 146, making the conference bridge available for future use in association with other calls. ICSold sends a release complete message (REL COMplete) 148 to switch 1.

It should be recognized that the method of handing off the call from ICSold to ICSnew, as described in FIG. 6, is implemented by ICSnew, switch 2 and switch 1 such that ICSold need not be involved in the handoff process. This method also provides an additional improvement in that multiple call appearances are not necessary on the ISDN lines connecting intelligent cell sites to the switches.

THIRD EMBODIMENT OF THE PRESENT INVENTION

A third embodiment of the present invention relating to a method and system for initiating handoffs of calls between intelligent cell sites is described with reference to the call flow diagram of FIG. 7.

It should be understood that the call flows described in FIG. 7 occur in the environment as previously described with reference to the block diagram of FIG. 4. As shown in FIG. 4, the ISDN line 70 connecting switch 1 and ICSold includes a feature activator associated with GALT.

Figure 7:
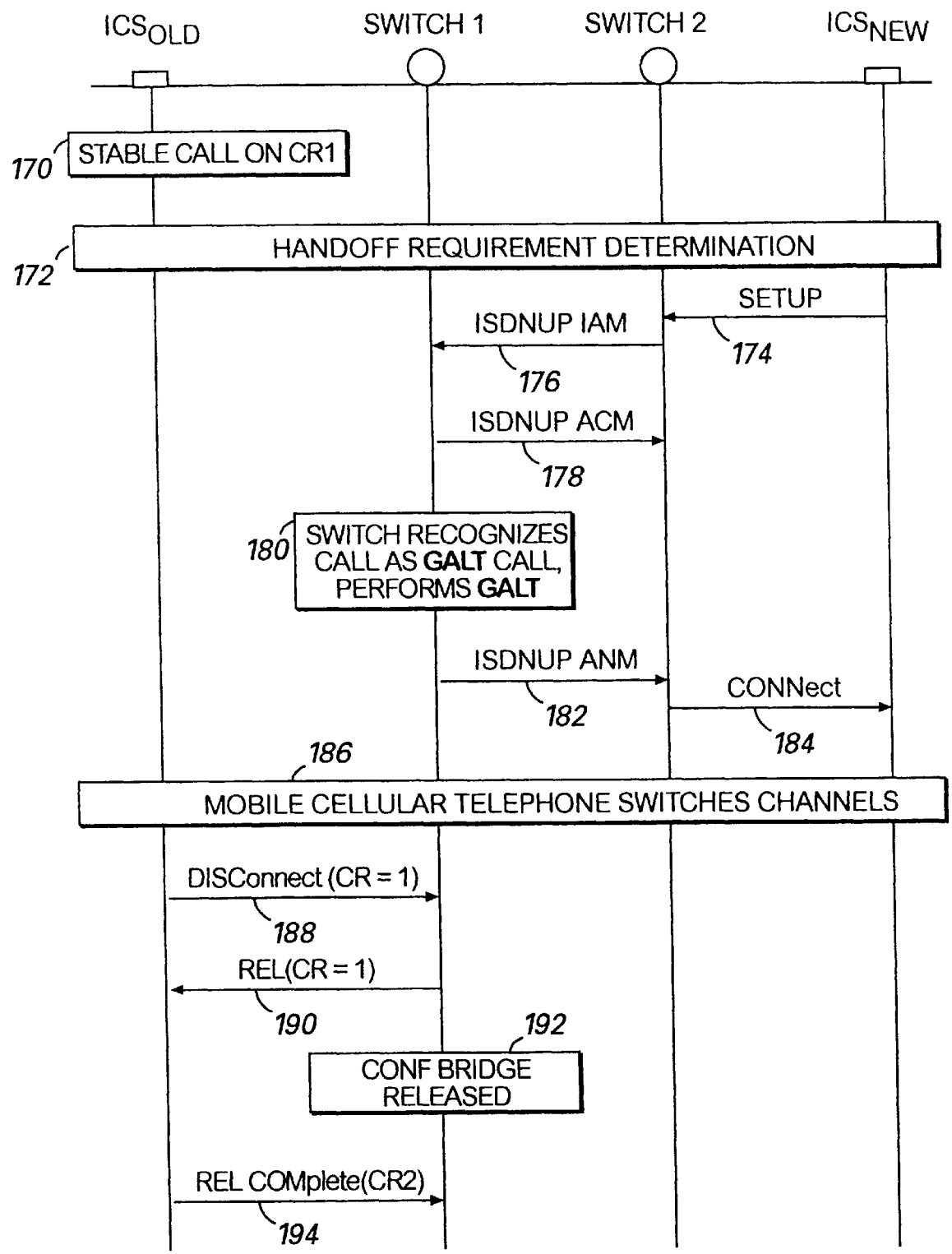
FIG. 7 is a call flow diagram describing a third embodiment of the preferred method and system for transferring a call between intelligent cell sites.

A call is established between a calling station and a mobile cellular telephone within the range of ICSold, as shown at 170 in FIG. 7. The switch through which the call is routed, e.g., switch 1 in FIG. 4, assigns a "GALT Virtual Directory Number" (GVDN) to the call. In the example of FIG. 4, the GVDN is assigned by switch 1 to the call between the calling station 68 and the mobile cellular telephone 71 when a call is made to the ISDN line 70 associated with the ICSold during the setup of the call. The GVDN is assigned by switch 1 from a pool of virtual directory numbers provisioned in switch 1 for use by the GALT feature. The GVDN is not a number associated with a real ISDN line, but is a virtual number. The switch can more easily keep track of the GVDN than it can keep track of call appearances that occur when an actual ISDN number is called.

As a result of the mobile cellular telephone moving out of the range of ICSold and into the range of ICSnew, ICSnew is notified at 172 that a handoff is required, as discussed above. ICSnew initiates a call to switch 2 and sends a set up message (SETUP) 174 to switch. Switch 2 calls switch 1, associated with ICSold, and delivers an SS7 initial address message (ISDN IAM) 176. Switch 1 then calls switch 2 and sends an acknowledgment message (ISDNUP ACM) 178.

The call 176 from switch 2 to switch 1 contains the calling number, which is the number of ISDN line connected between switch 2 and ICSnew. However, the called number is not the number of the actual ISDN line connecting ICSold and switch 1, but rather is the GVDN. The GVDN is obtained by ICSnew either from the mobile cellular telephone handset, from the CSC, or from ICSold. Because the GVDN is not the number of an actual ISDN line, calling the GVDN does not tie up an ISDN line nor does it generate a call appearance on the ISDN line.

When switch 1 receives the call 176 to the GVDN from switch 2, switch 1 recognizes the called number as a request for GALT. Switch 1 uses the called number and the GVDN as a key to identify all call segments. Switch 1 then reserves a conference bridge in switch 1 and connects call segment 1 between the calling station and switch 1, call segment 2 between switch 1 and ICSold, and call segment 3 between switch 1 and ICSnew, at 180. Switch 1 sends an SS7 answer message (ISDNUP ANM) 182 to switch 2. When the connections to the conference bridge are completed, switch 2 sends a connect message (CONNect) 184 to ICSnew, confirming that the call segments have been connected to the conference bridge.

Upon connection of the conference bridge, a connection is established not only from the calling station to ICSold, but also from the calling station to ICSnew via call segment 1 and call segment 3. Upon connection of the conference bridge, communication with the mobile cellular telephone continues to occur through ICSold. The mobile cellular telephone is notified to switch radio channels at 186 to allow communications to be controlled by ICSnew. The mobile cellular telephone then switches channels and communication is established with the mobile cellular telephone and ICSnew via radio transmission segment Rnew. Once the mobile cellular telephone has switched channels, ICSold sends a disconnect message (DISConnect) 188 to switch 1. Switch 1 then sends a release message (REL) 190 to ICSold, thus terminating the talk path which is no longer in use from switch 1 to ICSold. The conference bridge is then released 192, making the conference bridge available for future use in association with other calls. ICSold sends a release complete message (REL COMplete) 194 to switch 1.

If a subsequent handoff is required, e.g., between ICSnew and intelligent cell site 3 (ICS3), seen at 76 in FIG. 4, ICS3 initiates a call from ISDN line 77 to the same GVDN. As described above, switch 1 recognizes the GVDN as a request to initiate a handoff. In a manner similar to that described above, switch 1 connects to a conference bridge the existing call segments and a new call segment from switch 1 to ICS3. When the handoff has occurred, the old talk path from switch 1 to ICSnew is no longer in use and is released from the conference bridge, resulting in a transfer of the call to ICS3.

All subsequent handoffs are initiated by the new intelligent cell site calling the same GVDN. Because each handoff requires a call to the GVDN at switch 1, switch 1 is able to determine which intelligent cell site is currently handling the call and which intelligent cell site is to receive the handoff. Thus switch 1 is able to determine the direct path for a handoff from the old intelligent cell site to the new intelligent cell site.

In summary, the switch that assigns the GVDN controls all handoffs and thus is aware of the current talk path and the talk path requested by the new intelligent cell site. No utilization of multiple SS7 trunks between switches is required when multiple handoffs occur because all requests for handoffs are directed to the GVDN, which is controlled by a single switch. Therefore, all shoelacing effects are eliminated because the switch uses the GVDN to remember to where the call was originally placed, and thus the switch can directly transfer the call from the old intelligent cell site to the new intelligent cell site.

It should be understood that although the embodiments of the present invention as described above with reference to an operating environment with ICSnew and ICSold connected to different switches, the present invention is not limited to such an environment. All aspects of the present invention can be implemented in a cellular telecommunications network in which ICSnew and ICSold are connected to the same switch. Those skilled in the art will easily be able to adapt the signals shown in the call flow diagram of FIGS. 5, 6, and 7 such that the present invention call be implemented when the old and new intelligent cell sites are connected to a single switch.

From the foregoing it will be appreciated that the disclosed embodiments of the present invention overcome the drawbacks of the prior art described hereinabove and accomplish the previously stated objects of the present invention. From the description of the alternate preferred embodiments, equivalents of the elements shown therein will suggest themselves to those skilled in the art. Equivalent ways of constructing and implementing other embodiments of the present invention will suggest themselves to practitioners of the art. Therefore, the scope of the present invention is to be limited only by the claims below.

What is claimed is:

1. In a cellular telecommunications network including a first switch connected to a first intelligent cell site, a second switch connected to a second intelligent cell site, and a third switch connected to a third intelligent cell site, said first switch and said third switch being connected to said second switch, wherein a call is established between a calling station and a mobile cellular telephone located within range of the first intelligent cell site, a method for transferring the call from the first intelligent cell site to the second intelligent cell site and then from the second intelligent cell site to the third intelligent cell site, comprising the steps of:

when the mobile cellular telephone moves within the range of the second intelligent cell site:

A. initiating a communication from the second intelligent cell site to the first intelligent cell site via the first switch;

B. reserving a conference bridge in the first switch responsive to receipt of the communication;

C. connecting on the conference bridge a first call segment from the calling station to the first switch, a second call segment from the first switch to the first intelligent cell site, and a third call segment from the first switch to the second intelligent cell site via a second switch, the first call segment being a segment of the call from the calling station to the first switch, the second call segment being another segment of the call from the first switch to the first intelligent cell site, and the third call segment being the communication from the second intelligent cell site via the second switch to the first switch;

D. transferring control of the call from the first intelligent cell site to the second intelligent cell site;

E. releasing the second call segment;

F. disconnecting the conference bridge; and when the mobile cellular telephone moves within the range of the third intelligent cell site;

repeating steps A–F but with respect to the second intelligent cell site, the third intelligent cell site and the second switch so as to effect transfer to the control of the call from the second intelligent cell site to the third intelligent cell site in the same manner as the transferring of the call from the first intelligent cell site to the second intelligent cell site.

2. In a cellular telecommunications network including a first switch connected to a first intelligent cell site, a second switch connected to a second intelligent cell site, and a third switch connected to a third intelligent cell site, said first switch and said third switch being connected to said second switch, wherein a call is established between a calling station and a mobile cellular telephone located within range of the first intelligent cell site, a method for transferring the call from the first intelligent cell site to the second intelligent cell site and then from the second intelligent cell site to the third intelligent cell site, comprising the steps of:

when the mobile cellular telephone moves within the range of the second intelligent cell site:

A. initiating a communication from the second intelligent cell site to the second switch;

B. sending a message from the second switch to the first switch that includes a generic address parameter;

C. reserving a conference bridge in the first switch responsive to receipt of the message;

D. connecting on the conference bridge a first call segment from the calling station to the first switch, a second call segment from the first switch to the first intelligent cell site, and a third call segment from the first switch to the second intelligent cell site via a second switch, the first call segment being a segment of the call from the calling station to the first switch, the second call segment being another segment of the call from the first switch to the first intelligent cell site, and the third call segment being the communication from the second intelligent cell site via the second switch to the first switch;

E. transferring control of the call from the first intelligent cell site to the second intelligent cell site;

F. releasing the second call segment;

G. disconnecting the conference bridge; and when the mobile cellular telephone moves within the range of the third intelligent cell site;

repeating steps A–G but with respect to the second intelligent cell site, the third intelligent cell site and the second switch so as to effect transfer of the control of the call from the second intelligent cell site to the third intelligent cell site in the same manner as the transferring of the call from the first intelligent cell site to the second intelligent cell site.

3. In a cellular telecommunications network including a first switch connected to a first intelligent cell site and a second switch connected to a second intelligent cell site, said first switch being connected to said second switch, wherein a call is established between a calling station and a mobile cellular telephone located within range of said first intelligent cell site, a method for transferring the call from said first intelligent cell site to said second intelligent cell site, comprising the steps of:

assigning a virtual number to said call;

when said mobile cellular telephone moves within range of said second intelligent cell site:

initiating a communication from said second intelligent cell site to said first switch using said virtual number;

reserving a conference bridge in said first switch responsive to receipt of said communication using said virtual number;

connecting on said conference bridge a first call segment from said calling station to said first switch, a second call segment from said first switch to said first intelligent cell site, and a third call segment from said first switch to said second intelligent cell site via said second switch;

transferring control of said call from said first intelligent cell site to said second intelligent cell site;

releasing said second call segment; and disconnecting said conference bridge.

* * * * *